United States Patent
Lee et al.

(10) Patent No.: US 11,720,234 B2
(45) Date of Patent: *Aug. 8, 2023

(54) AUTOMATION TOOL FOR GENERATING WEB PAGES AND LINKS

(71) Applicant: Constellation Software Inc., New York, NY (US)

(72) Inventors: Diana Lee, New York, NY (US); Matt Woodruff, New York City, NY (US)

(73) Assignee: Constellation Software Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,350

(22) Filed: Dec. 7, 2021

(65) Prior Publication Data

US 2022/0091712 A1    Mar. 24, 2022

Related U.S. Application Data

(63) Continuation of application No. 16/384,250, filed on Apr. 15, 2019, now Pat. No. 11,199,949.

(60) Provisional application No. 62/657,131, filed on Apr. 13, 2018.

(51) Int. Cl.
| | | |
|---|---|---|
| *G06F 3/0482* | (2013.01) | |
| *G06F 3/0483* | (2013.01) | |
| *G06Q 30/0241* | (2023.01) | |
| *G06F 16/954* | (2019.01) | |
| *G06F 16/955* | (2019.01) | |

(52) U.S. Cl.
CPC .......... *G06F 3/0483* (2013.01); *G06F 3/0482* (2013.01); *G06F 16/954* (2019.01); *G06F 16/9566* (2019.01); *G06Q 30/0277* (2013.01)

(58) Field of Classification Search
CPC .. G06F 3/0483; G06F 16/9566; G06F 16/954; G06F 3/0482; G06Q 30/0277; H04L 67/02
See application file for complete search history.

(56) References Cited

U.S. PATENT DOCUMENTS

| | | |
|---|---|---|
| 8,543,715 B1 | 9/2013 | Rabbat et al. |
| 2005/0177401 A1 | 8/2005 | Koeppel et al. |
| 2005/0216342 A1* | 9/2005 | Ashbaugh .......... G06Q 30/0277 705/14.72 |

(Continued)

*Primary Examiner* — Phenuel S Salomon
(74) *Attorney, Agent, or Firm* — Scully, Scott, Murphy & Presser, P.C.

(57) ABSTRACT

A method for a user interface for creating a preview content page is provided. Client identification, time period and campaign information are received via a user interface input field. An application programming interface is invoked to access a third party site's data content associated with the campaign information available during the time period. From the third party site, the data content associated with the campaign information available during the time period and metadata associated with the data content are received. The data content has advertisements. The advertisements are presented in the data content on the user interface's display window. A uniform resource locator (URL) link to the plurality of advertisements is generated, for allowing users to share the link on a public web site page. A computer readable storage medium and a user interface system are also provided.

12 Claims, 16 Drawing Sheets

(56) References Cited

U.S. PATENT DOCUMENTS

| | | | |
|---|---|---|---|
| 2009/0100505 A1* | 4/2009 | Shaty | G06F 21/50 |
| | | | 726/3 |
| 2009/0265243 A1 | 10/2009 | Karassner et al. | |
| 2009/0313116 A1* | 12/2009 | Ashbaugh | G06Q 30/0255 |
| | | | 705/14.47 |
| 2009/0319365 A1* | 12/2009 | Waggoner | G06Q 30/02 |
| | | | 705/26.1 |
| 2010/0332330 A1* | 12/2010 | Goel | G06Q 30/0275 |
| | | | 705/14.66 |
| 2011/0035265 A1 | 2/2011 | King et al. | |
| 2011/0153412 A1* | 6/2011 | Novikov | G06Q 30/02 |
| | | | 705/14.42 |
| 2011/0213655 A1* | 9/2011 | Henkin | G06Q 30/00 |
| | | | 707/E17.061 |
| 2011/0252117 A1* | 10/2011 | Sng | H04L 63/029 |
| | | | 709/219 |
| 2011/0258050 A1 | 10/2011 | Chan et al. | |
| 2011/0258529 A1 | 10/2011 | Doig et al. | |
| 2011/0276720 A1* | 11/2011 | Ickman | G06F 9/541 |
| | | | 709/245 |
| 2012/0290399 A1* | 11/2012 | England | G06Q 50/01 |
| | | | 705/14.66 |
| 2013/0226699 A1* | 8/2013 | Long | G06Q 30/01 |
| | | | 705/27.1 |
| 2014/0222581 A1* | 8/2014 | Mathur | G06Q 50/01 |
| | | | 705/14.66 |
| 2016/0048880 A1 | 2/2016 | Linden et al. | |
| 2016/0283451 A1 | 9/2016 | Young | |

* cited by examiner

2018_Feb_xx-Brand_Traffic_XYZ_Social Network

○ 2018 Feb xx-Brand Traffic XYZ Social Network Still Corporate
Destination URL(s):
https://www.acmenxsbrand.com/new-inventory/index.htm

[ Target ]

Location: Country, Location 1 (08612), Location 2 (08810), Location 3 (08816), Location 4 (07728), Location 5 (08520), Location 6 (08824), Location 7 (08652), Location 8, Location 9 (08631), Location 10 (08902), Location 11 (08540) Location 12

Age: ## - ##

Placements: on pages: News Feed on desktop computers, Social Network Feed, News Feed on mobile devices, Right column on desktop computers, Instant Article or Marketplace on mobile devices People Who Match: Employers: XYZ Caremark, XYZ Health or XYZ Pharmacy — Targeting information Mobile Ad Preview xx-Brand - Your Loc XX
xx-Brand Dealer!
Sponsored We are pleased to announce our Vehicle Purchase Program! The program allows affiliated company employees, their families, and friends to purchase a xx-Brand at a pre-determined price.

Work at XYZ?

We've got a deal for you!
Offer ends 02/28/18 xx-Brand.com
We've got a deal for you!
Offer ends 02/28/18

[ LEARN MORE ]

The data is all pulled from Social Network ads/graph API, and mirrors what is found in Power editor.

| □ | ⊙ | 2018_Sep_YY zzzzzz_Traffic_Social Work_Social Network | Click | $15.00 Lifetime | $0.00 of $15.00 | 09/06/2018 | Sep 2, 2018 - Sep 6, 2018 5 days | |
|---|---|---|---|---|---|---|---|---|
| ☒ | ⊙ | 2018_Sep_YY zzzzzz_Traffic_Administration_Social Network ✏ ▪ View Charts ✏ Edit ⧉ Duplicate | Click | $15.00 Lifetime | $0.00 of $15.00 | 10/01/2018 | Sep 26, 2018 - Oct 1, 2018 6 days | ✏ |
| □ | ⊙ | 2018_Sep_YY zzzzzz_Traffic_Healthcare_Social Network | Click | $100.00 Lifetime | $0.00 of $100.00 | 09/30/2018 | Sep 1, 2018 - Sep 30, 2018 30 days | |

Fig. 8 (Cont.-2)

AUTOMATION TOOL FOR GENERATING WEB PAGES AND LINKS

CROSS-REFERENCE TO RELATED APPLICATIONS

This application is a continuation of U.S. patent application Ser. No. 16/384,250 filed on Apr. 15, 2019, which claims the benefit of U.S. Provisional Application No. 62/657,131 filed on Apr. 13, 2018, the entire contents of each of which are incorporated herein by reference.

BACKGROUND

The present application relates generally to computers, and computer applications, and more particularly to generating of online and/or web pages and links to content stored on a network of computers.

SUMMARY

According to an aspect of the disclosure, a method for a user interface for creating a preview content page is provided. The method includes receiving client identification, time period and campaign information via a user interface input field. The method further includes invoking an application programming interface to access a third party site's data content associated with the campaign information available during the time period. The method further includes receiving from the third party site, the data content associated with the campaign information available during the time period and metadata associated with the data content, the data content has a plurality of advertisements. The method further includes presenting the plurality of advertisements in the data content on the user interface's display window. The method also includes generating a uniform resource locator (URL) link to the plurality of advertisements, for allowing users to share the link on a public web site page.

According to another aspect of the disclosure, a computer readable storage medium is provided. The computer readable storage medium stores a program of instructions executable by a machine to perform a method of for a user interface for creating a preview content page. The method includes receiving client identification, time period and campaign information via a user interface input field. The method further includes invoking an application programming interface to access a third party site's data content associated with the campaign information available during the time period. The method further includes receiving from the third party site, the data content associated with the campaign information available during the time period and metadata associated with the data content, the data content has a plurality of advertisements. The method further includes presenting the plurality of advertisements in the data content on the user interface's display window. The method also includes generating a uniform resource locator (URL) link to the plurality of advertisements, for allowing users to share the link on a public web site page.

According to yet another aspect of the disclosure, a user interface system is provided. The user interface system includes at least one hardware processor coupled with a network interface. The at least one hardware processor operable to perform at least: receiving client identification, time period and campaign information via a user interface input field; invoking an application programming interface to access a third party site's data content associated with the campaign information available during the time period; receiving from the third party site, the data content associated with the campaign information available during the time period and metadata associated with the data content, the data content has a plurality of advertisements; presenting the plurality of advertisements in the data content on the user interface's display window; and generating a uniform resource locator (URL) link to the plurality of advertisements, for allowing users to share the link on a public web site page.

BRIEF DESCRIPTION OF THE SEVERAL VIEWS OF THE DRAWINGS

Features as well as the structure and operation of various embodiments are described below with reference to the accompanying drawings. In the drawings, like reference numbers indicate identical or functionally similar elements.

FIG. 5 is a diagram illustrating a user interface that displays the content pulled from a third party social network profile page in one embodiment.

FIG. 8 illustrates an example user interface display showing a batch of advertisements (content) with metadata in a single view in one embodiment.

FIG. 10 illustrates an example user interface that shows previews of advertisement and associated metadata in one embodiment.

DETAILED DESCRIPTION

An automation tool may create web pages, for example, for campaign management, and allow users to automatically run campaigns with a variety of creative and granularity at scale. Interactive preview links may be generated and provided to users, to be able to preview content such as advertisements on their web site's web pages, on a network-based such as Internet-based photo-sharing application and service, and/or other messaging platforms, for instance, quickly and efficiently.

For example, in an example use case scenario, an entity such as a car dealership may desire to publish new content (e.g., such as a new offer or advertisement) associated with a vehicle, for instance, derived from information obtained from the vehicle's manufacturer. Traditionally, such information usually is manually obtained and built into a new content. An automation tool of the present disclosure in some aspects allows for automatically and seamlessly creating the new content and an associated link, for example, for a preview.

In some aspects, detailed question/answer capabilities may be provided for creating error-free creative items (e.g., displayed on online content pages) at scale, e.g., by placing or locating campaign details next to each creative item within the preview window, more easily viewable than existing content creation interfaces would allow.

The automation tool may in some aspects include scaling features, which allow users to duplicate and customize content such as campaigns across many different websites (e.g., different product dealers, e.g., automobile dealerships) with industry-leading speed and effectiveness. The automation tool, for example, may provide a feature that allows users to reuse the content (e.g., campaign) from period to period (e.g., one month to the next), which may include performing batch renaming and date editing functions across numerous (e.g., thousands of) content items such as advertisements, for instance, on a periodic basis (e.g., monthly).

Figure 1:
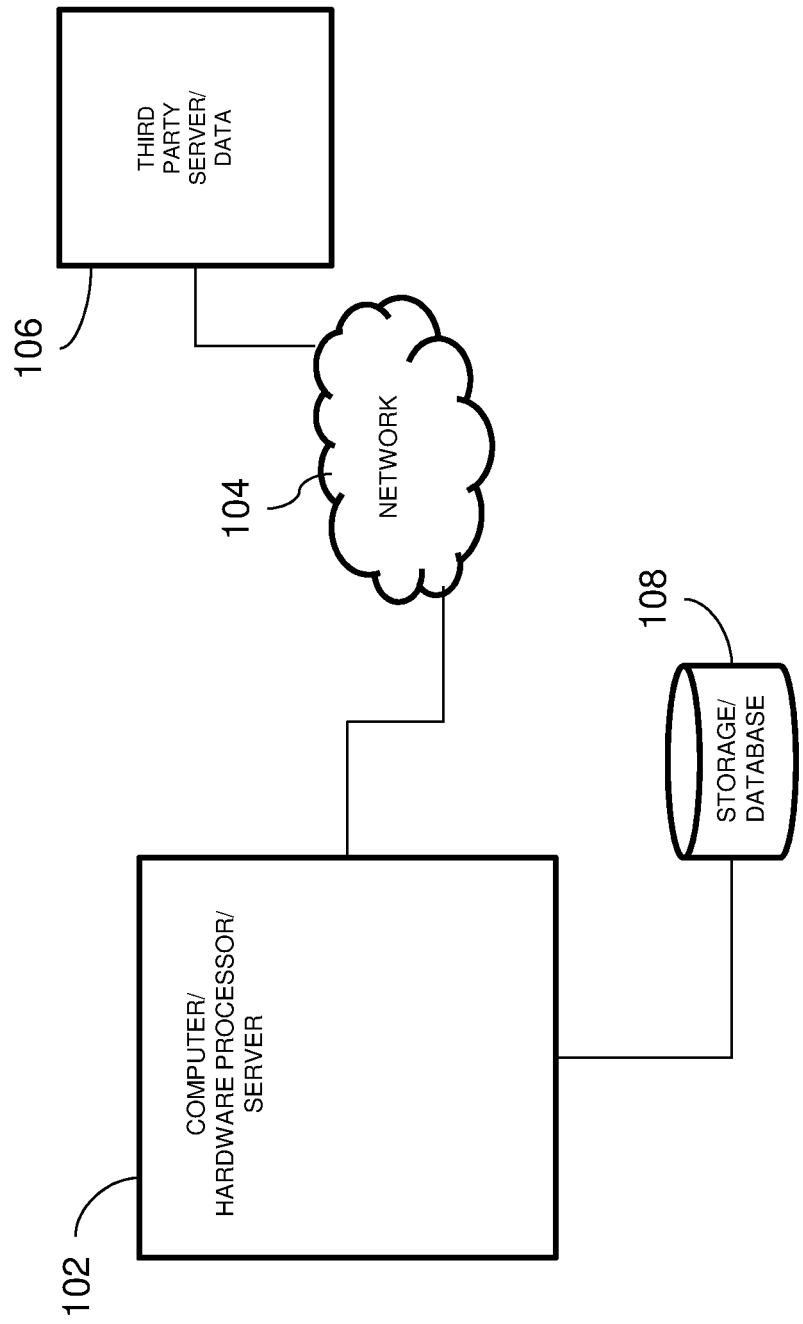
FIG. 1 is a diagram illustrating components of a system that provides an automation tool for generating online pages and links in one embodiment.

In one aspect, the functionalities and modules of the system and methods of the present disclosure may be implemented or carried out by one or more hardware processors, for example, distributedly on different processing systems or on any single platform, for instance, accessing data stored locally or distributedly on the network. FIG. 1 illustrates components of a system, which may perform one or more methodologies and/or functions described herein. A processing system, for example, may include a computer or computing device such as hardware processors or microprocessors 102, which may be coupled with a memory device, a network interface, input/output interface, and any other devices or interfaces found in a computer device. At least one hardware processor at 102 may communicate with a third party server or computing device 106, for example, via a network such as a communication network 104, to perform one or more functions described here. The network 104 may include a wireless and/or wired network, a data network such as the Internet, and/or others. One or more hardware processors 102 may be also coupled with a storage device, for example, which may be accessible directly or via a communication network 104.

Various aspects of the present disclosure may be embodied as a program, software, or computer instructions embodied or stored in a computer or machine usable, readable or executable medium, which causes the computer or machine to perform the steps of the method when executed on the computer, processor, and/or machine. For instance, a program storage device readable by a machine, tangibly embodying a program of instructions executable by the machine to perform various functionalities and methods described in the present disclosure may be provided.

The system and method of the present disclosure may be implemented and run on a general-purpose computer or special-purpose computer system. The computer system may be any type of known or will be known systems and may include a hardware processor, memory device, a storage device, input/output devices, internal buses, and/or a communications interface for communicating with other computer systems in conjunction with communication hardware and software, etc.

Figure 2:
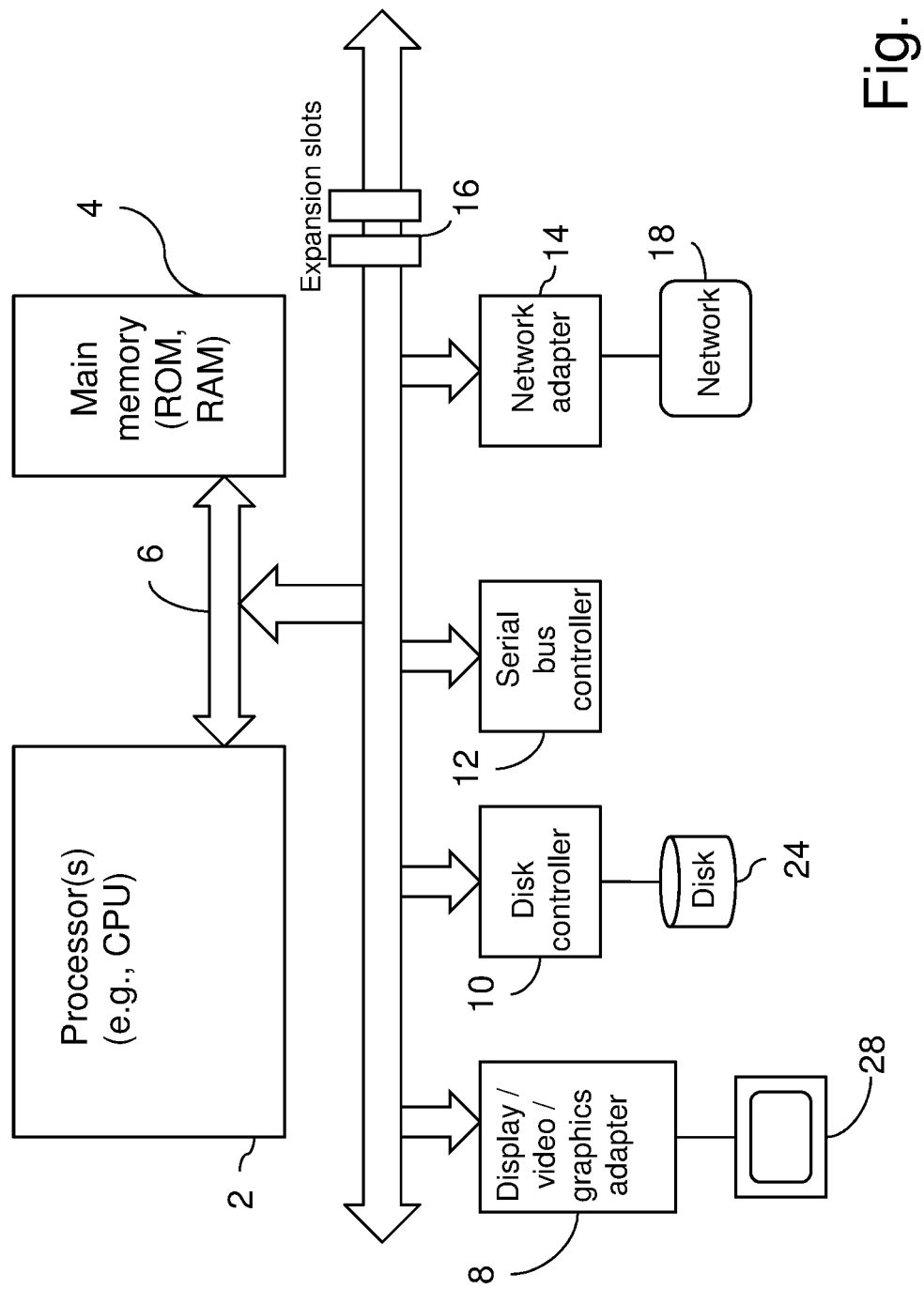
FIG. 2 illustrates an example processing device that may implement the system and/or method of the present disclosure.

FIG. 2 illustrates an example processing device that may implement the system and/or method of the present disclosure. For instance, a user device or a backend system may include components shown in FIG. 2. One or more central processing units (e.g., CPUs) 2 may include one or more arithmetic/logic unit (ALU), fast cache memory and registers and/or register file, and/or another type of processors or processing hardware. Registers are small storage devices; register file may be a set of multiple registers. Caches are fast storage memory devices, for example, comprising static random access (SRAM) chips. Caches serve as temporary staging area to hold data that the CPU 2 uses. Shown is a simplified hardware configuration. CPU 2 may include other combination circuits and storage devices. One or more central processing units (CPUs) 2 execute instructions stored in memory 4, for example, transferred to registers in the CPU 2. Buses 6, for example, are electrical wires that carry bits of data between the components. Memory 4 may include an array of dynamic random access memory (DRAM) chips, and store program and data that CPU 2 uses in execution. The system components may also include input/output (I/O) controllers and adapters connected to the CPU 2 and memory 4 via a bus, e.g., I/O bus and connect to I/O devices. For example, display/graphic adapter connects 8 a monitor 28 or another display device/terminal; disk controller 10 may connect hard disks 24, for example, for permanent storage; serial controller 12 such as universal serial bus (USB) controller may connect input devices such as keyboard and mouse, output devices such as printers; network adapter 14 connects the system to another network, for example, to other machines. The system may also include expansion slots to accommodate other devices to connect to the system. For example, a hard disk 24 may store the program of instructions and data that implement the above described methods and systems, which may be loaded into the memory 4, then into the CPU's storage (e.g., caches and registers) for execution by the CPU (e.g., ALU and/or other combination circuit or logic). In another aspect, all or some of the program of instructions and data implementing the above described methods and systems may be accessed, and or executed over the network 18 at another computer system or device. FIG. 2 is only one example of a computer system. The computer system that may implement the methodologies or system of the present disclosure is not limited to the configuration shown in FIG. 2. Rather, another computer system may implement the methodologies of the present disclosure, for example, including but not limited to special processors such as field programmable gate array (FPGA) and accelerators.

In one embodiment, the present invention may be embodied as a computer program product that may include a computer readable storage medium (or media) and/or a computer readable storage medium. Such computer readable storage medium may store computer readable program instructions for causing a processor to carry out one or more methodologies described here. In one embodiment, the computer readable storage medium includes a tangible device that can retain and store instructions for use by an instruction execution device. Examples of the computer readable storage medium may include, but is not limited to, an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, but not limited to only those examples.

The terms "computer system" and "computer network" as may be used in the present application may include a variety of combinations of fixed and/or portable computer hardware, software, peripherals, mobile, and storage devices. The computer system may include a plurality of individual components that are networked or otherwise linked to perform collaboratively, or may include one or more stand-alone components. The hardware and software components of the computer system of the present application may include and may be included within fixed and portable devices such as mobile phone, tablet, smartphone, desktop, laptop, and/or server. A module may be a component of a device, software, program, or system that implements some "functionality", which can be embodied as software, hardware, firmware, electronic circuitry, or etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 3:
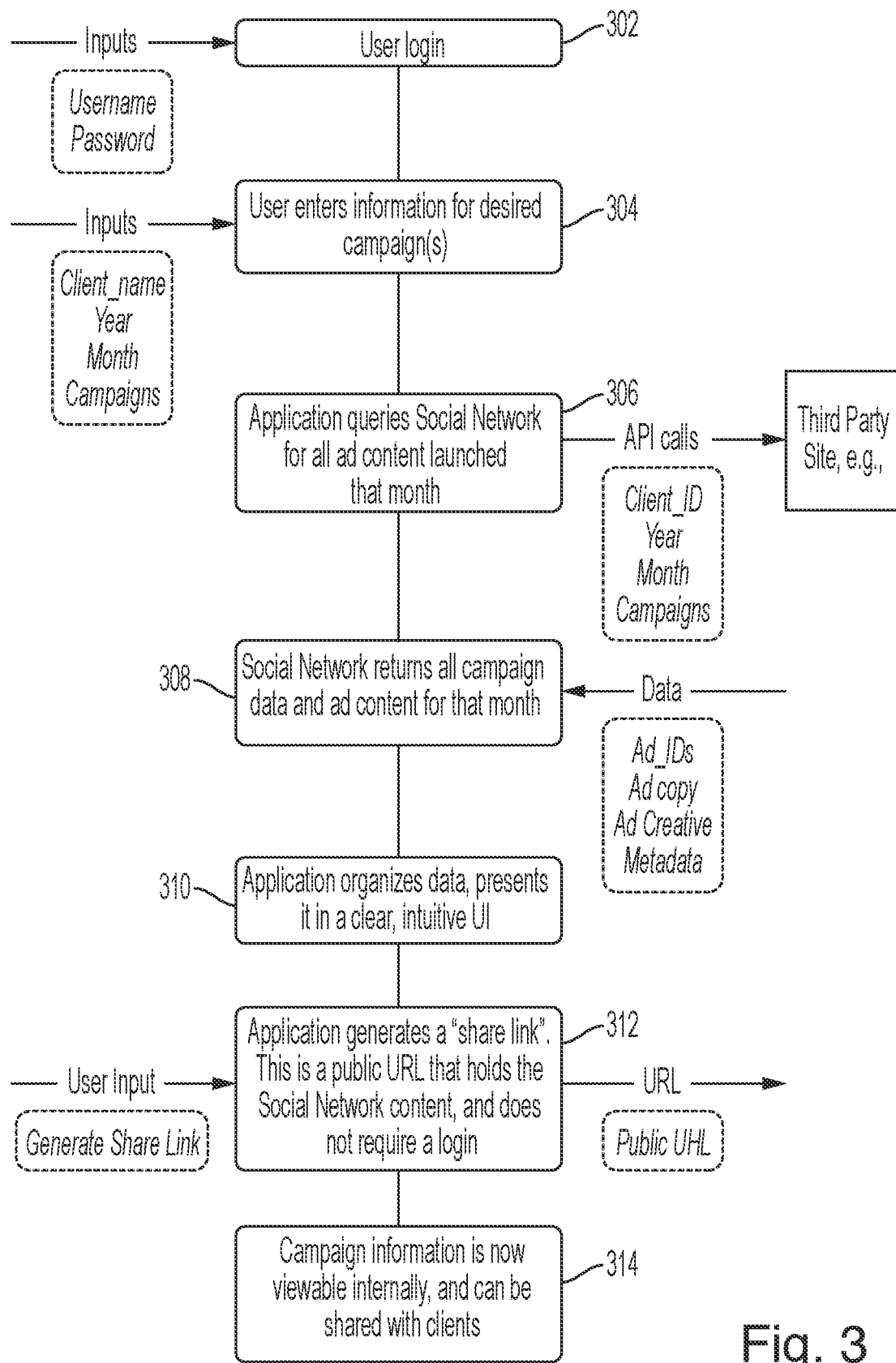
FIG. 3 is a flow diagram illustrating a method of generating an online content page and/or a link to an online content in one embodiment.

FIG. 3 is a flow diagram illustrating a method of generating an online content page and/or a link to an online content in one embodiment. The method may be implemented as a web or another server application, and/or a smartphone app, and/or another application, and may be executed by one or more hardware processors, e.g., running the web server, a smartphone app, or another. The application may include a user interface for interacting with a user, for example, displaying content and receiving user input or command. At 302, the user login information (e.g., user name and password) may be received for authenticating a user to run the application or the functionalities of the automated tool that allows users to be able to create content and associated link. For instance, a user may input the information via the user interface. At 304, once authenticated, the application, for example, via the user interface, may prompt for and/or receive user input associated with information for a desired campaign or advertisement. Such input may include, but is not limited to, the client name, year, month and campaign.

At 306, the application may query or search a third party server or database, such as Facebook® for the content launched for the period of interest (e.g., month and year input by the user). For instance, the application may invoke or call an application programming interface (API) provided by the third party server or site, for example, for accessing the third party site's data. At 308, the third party server or site may return all campaign data and advertisement data for the requested period of time. For example, the application may receive advertisement identifiers, advertisement copies or content, and metadata associated with the advertisements. Examples of metadata may include, but not limited to, metrics that indicate how the advertisement performed during the time it was run, spending that indicates how much budget was allocated to, and used by, the advertisement over its active lifecycle, date range that indicates when the advertisement was launched and when it concluded, Uniform Resource Locator (URL) where the advertisement leads to when clicked or selected, and Urchin Tracking Module (UTM) that indicates tracking information. In some aspects, the application may present pieces of this metadata to the user, in order to facilitate fast quality control (QC) of multiple advertisements quickly.

At 310, based on the data received from the third party site, the application creates a user interface content, e.g., an online page, which displays the advertisement content and metadata information.

Figure 7:
FIG. 7 shows content page of an example share link in one embodiment.

At 312, for example, responsive to receiving user activated request to create a link, the application generates a link that can be shared, referred to as a "share link". The generated link, for example, is a public Uniform Resource Locator (URL) that holds the third party site's content, which in some embodiments, do not require a login. The link is provided to a user, for example, via the user interface, allowing the user to navigate to the location via the URL. The URL, for example, points to the location where data content received from the third party sites can be found or shown. At 314, the campaign information is made viewable internally, and can be shared with a client, for example, an automobile or vehicle dealer. FIG. 7 as an example illustrates the content shown in the URL link. In some aspects, this URL shows the same data as the initial "ad preview". In some aspects, this URL shows data taken from the external application programming interface (API) (for example, FACEBOOK) and presents it to the user in a clear, intuitive manner. In the URL's content, the advertisements are emphasized, and other related data may be displayed as well.

Generally, an advertisement agent or the like creating online or web advertisement content for a client such as an automobile dealership, send monthly or periodic reports so that the client can review the advertisements and grant approval to launch the advertisements. While the content for advertisement is made available in some form, on a manufacturer's profile page of a social network application such as Facebook®, a client such as an automobile dealership do not have direct access to such a page. Moreover, accessing such a page is not made user-friendly, often requiring a professional campaign manager to be able to navigate the page. Hence, previously, screenshots and manually written copies were prepared in a spreadsheet, and for example, assets were compiled to be transferred via a file sharing application to the client. Programmatically, such procedure or process requires a significant amount of data begin sent to a client, requiring large amount of data transfer between the agent and the client on a computer network. Moreover, the data that is transferred in such manner is static, and is a non-interactive content attempting to portray videos and other dynamic creative items.

The automation tool (also referred to above as an application) of the present disclosure in some aspects provides a user friendly, dynamic methodology that allows users to be able to preview content, and which also improves on the functioning of a computer, by reducing the amount of data transfer between computer devices, and therefore also reducing any computer network data traffic.

Figure 4:
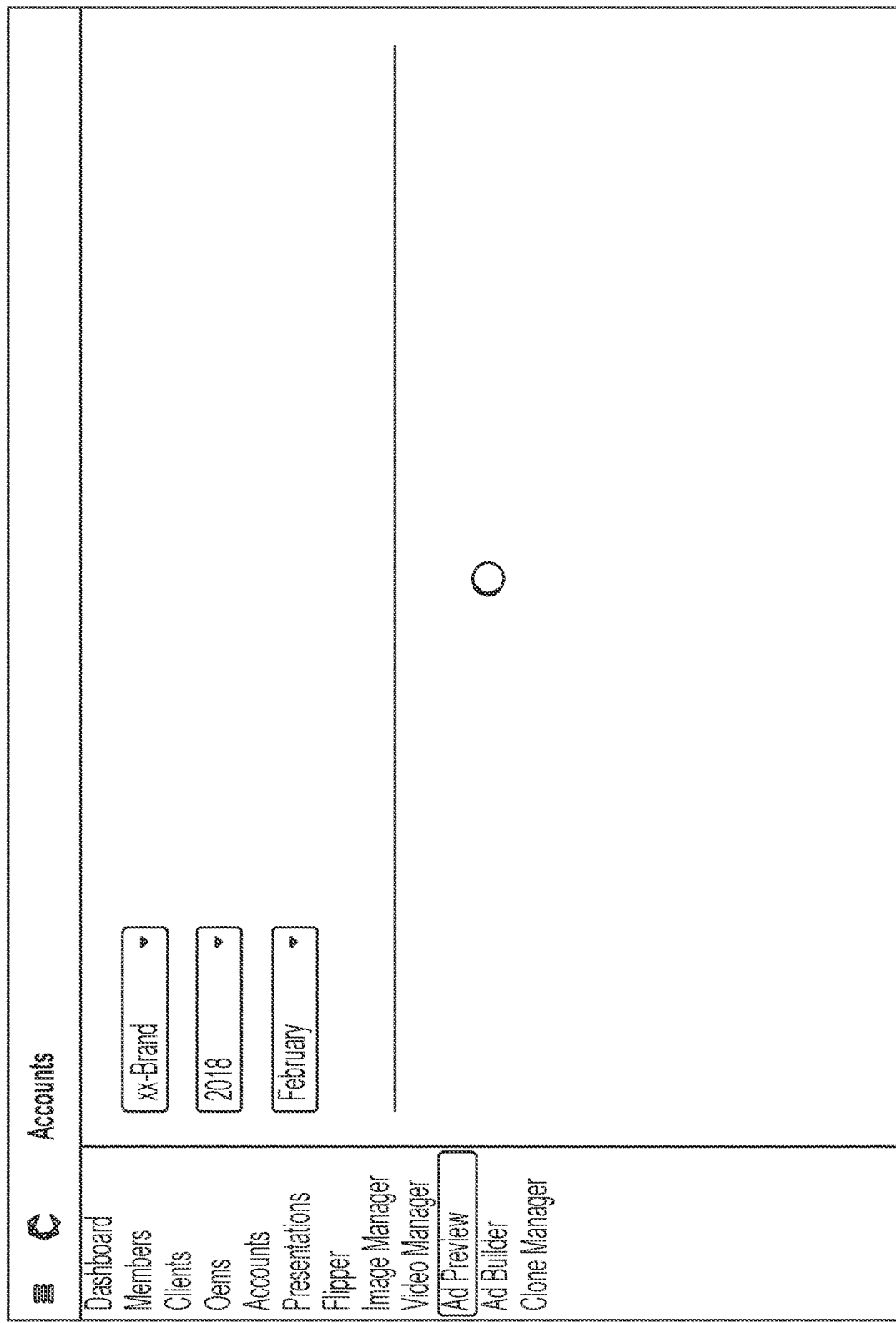
FIG. 4 is a diagram illustrating a user interface dropdown menu that allows user to preview content, in on embodiment.

FIG. 4 is a diagram illustrating a user interface dropdown menu that allows user to input information for previewing content, in on embodiment. A dropdown menu, for instance, allows a user to select client advertisement accounts, campaign year and campaign month. Using this information the application may query a third party site via the third party site's API.

Figure 5:
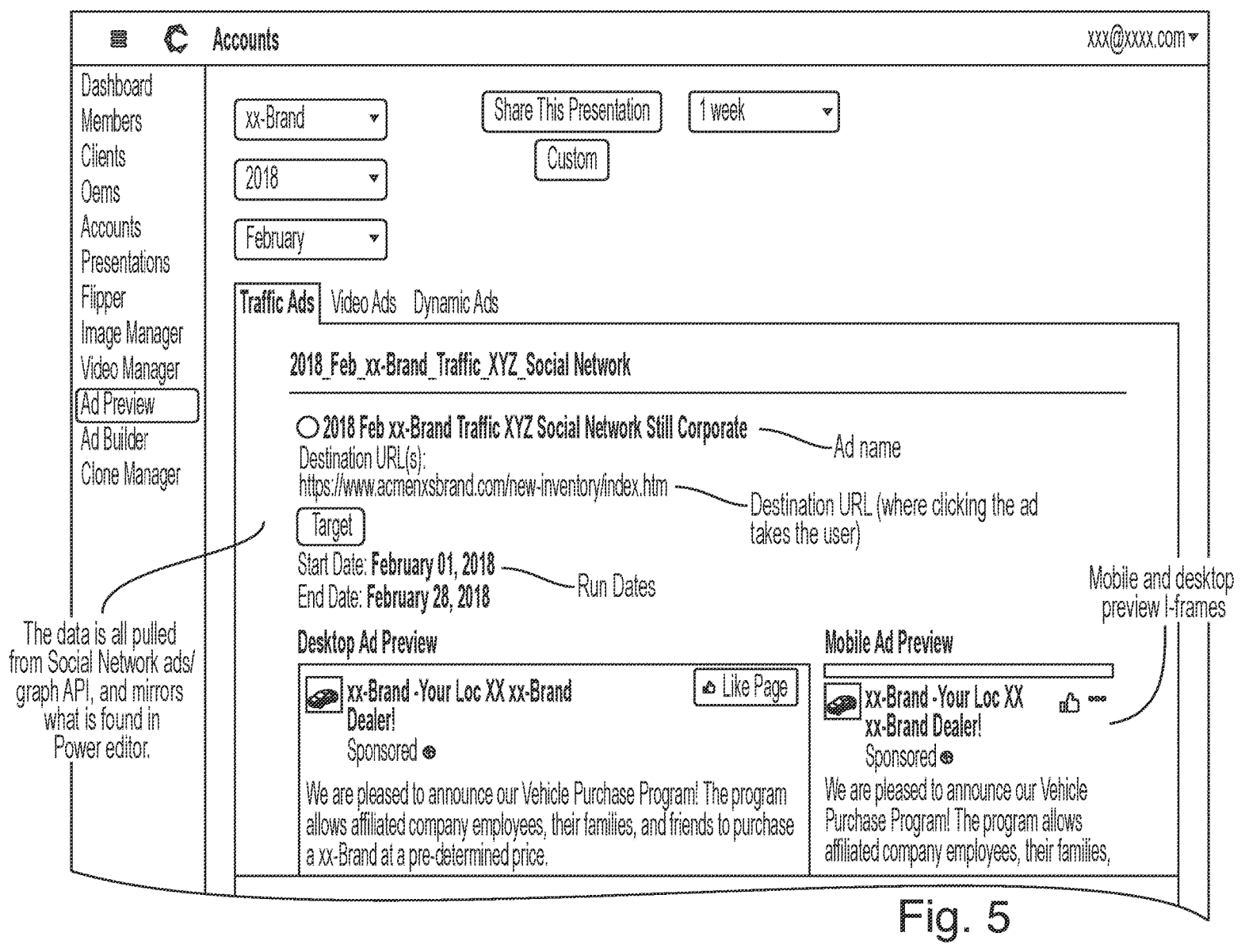

FIG. 5 is a diagram illustrating a user interface that displays the content pulled from a third party social network profile page in one embodiment. For example, based on the user input such as the client advertisement accounts, campaign year and campaign month, data may be extracted or pulled from a social network application or platform's advertisements/graphs API. The content displayed may mirror what is found in the social network platform's advertisement manager or the like. For instance, a user interface provides buttons or like user interface activation elements or features on the user interface, which may be activated by a user and in response to activation, may display preview views of the advertisements.

Figure 6:
FIG. 6 is a diagram illustrating a user interface that generated a URL in one embodiment.

The user interface may also include a share button or like user interface element. For example, a user may press or select the share button or the like to activate or trigger a generation of a share link. For instance, responsive to the pressing of the share button, a URL is generated to send to one or more clients. FIG. 6 is a diagram illustrating a user interface that generated a URL in one embodiment.

Clicking or selecting the URL or the shared link (e.g., shown in FIG. 6) navigates the user to a location that displays the same content. For example, FIG. 7 shows content page of an example share link in one embodiment. The share link shows identical information to the initial advertisement preview window. The share link page in one aspect is not password protected, so that clients can easily view their content in one convenient place. Computer functionality in this respect is improved in that the total time to send share link is considerably reduced, for example, 20 seconds versus 45 minutes or more that takes to send the same data to the client.

Figure 8:
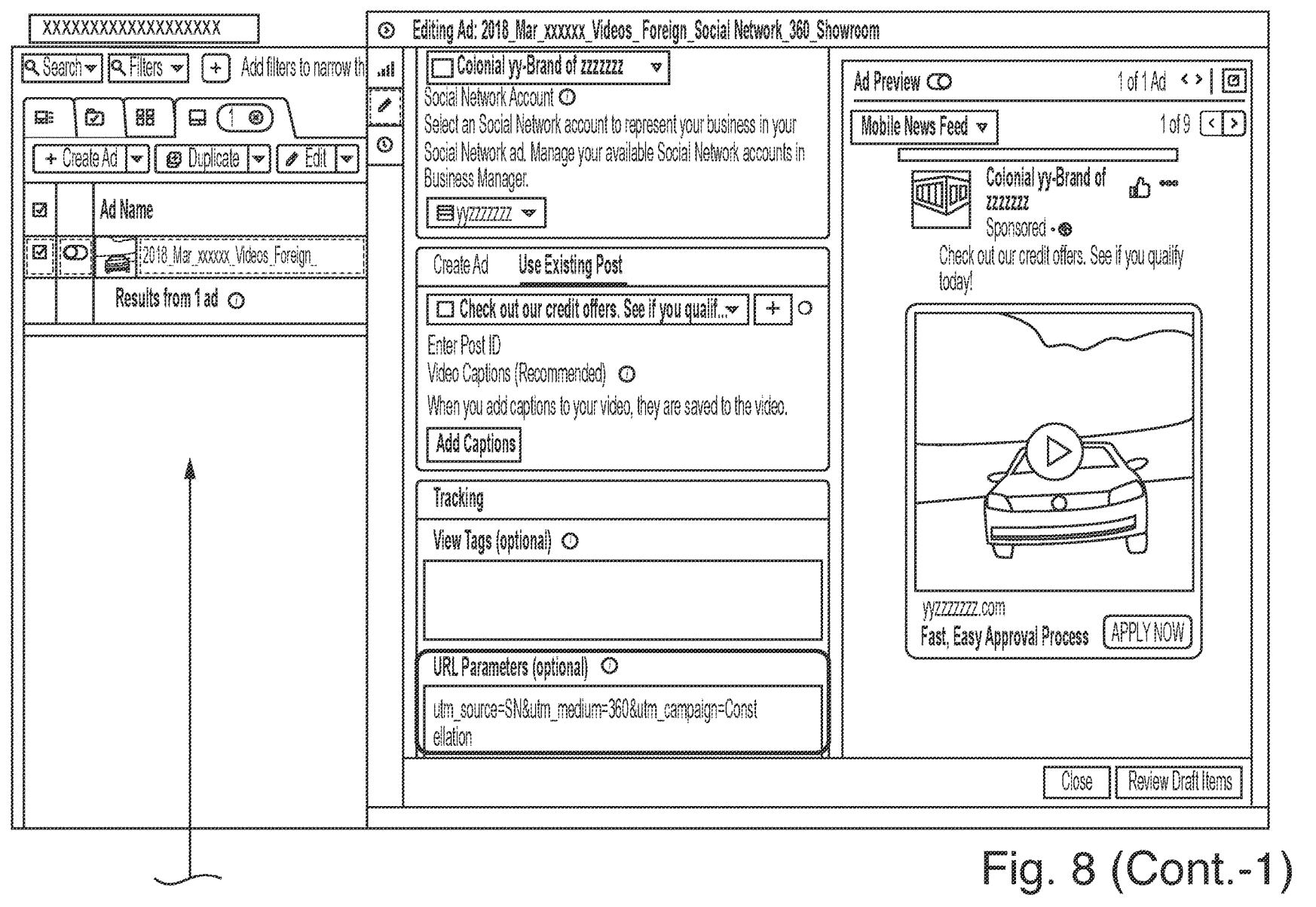

In some aspects, the automation tool of the present disclosure presents key advertisement metadata alongside each advertisement creative item for a quick and easy way to review a large batch of advertisements in a single view, for example, for quality assurance purposes. FIG. 8 illustrates an example user interface display showing a batch of advertisements (content) with metadata in a single view in one embodiment.

To ensure the correct spend, targets, and creative (item) are in each advertisement, meticulous testing is needed by an internal advertising team. This advertising is time consuming. Social network such as Facebook® internal platform requires that users open each creative in a new preview window. Additionally, spend and duration are in a separate page entirely. This requires users to perform dozens of clicks and load content to review each advertisement.

Figure 9:
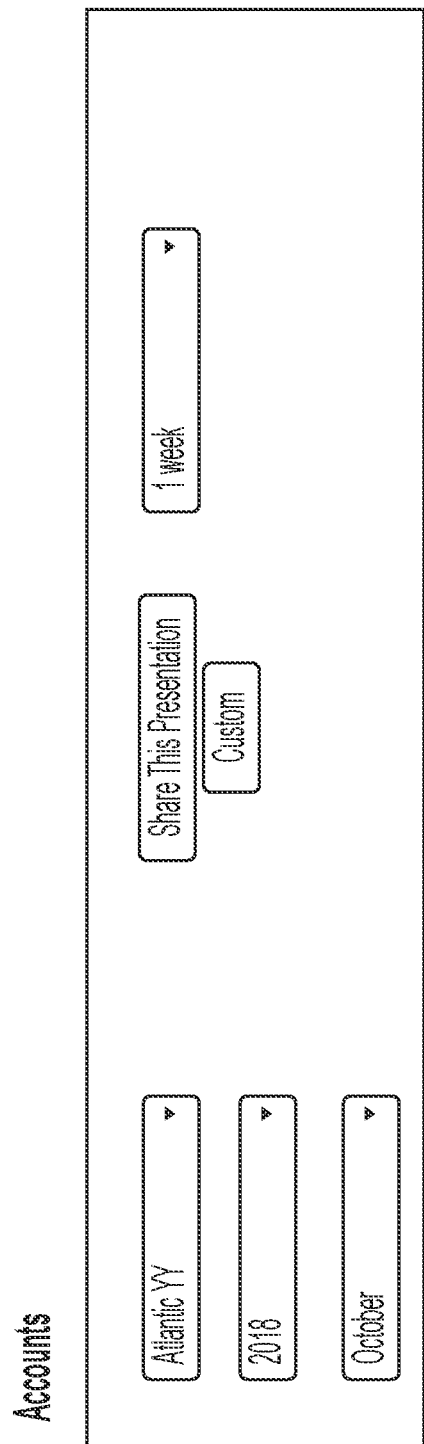
FIG. 9 illustrates an example user interface that allows the user to select or input information such as client advertisement accounts and time of the advertisement, in one embodiment.
Figure 10:
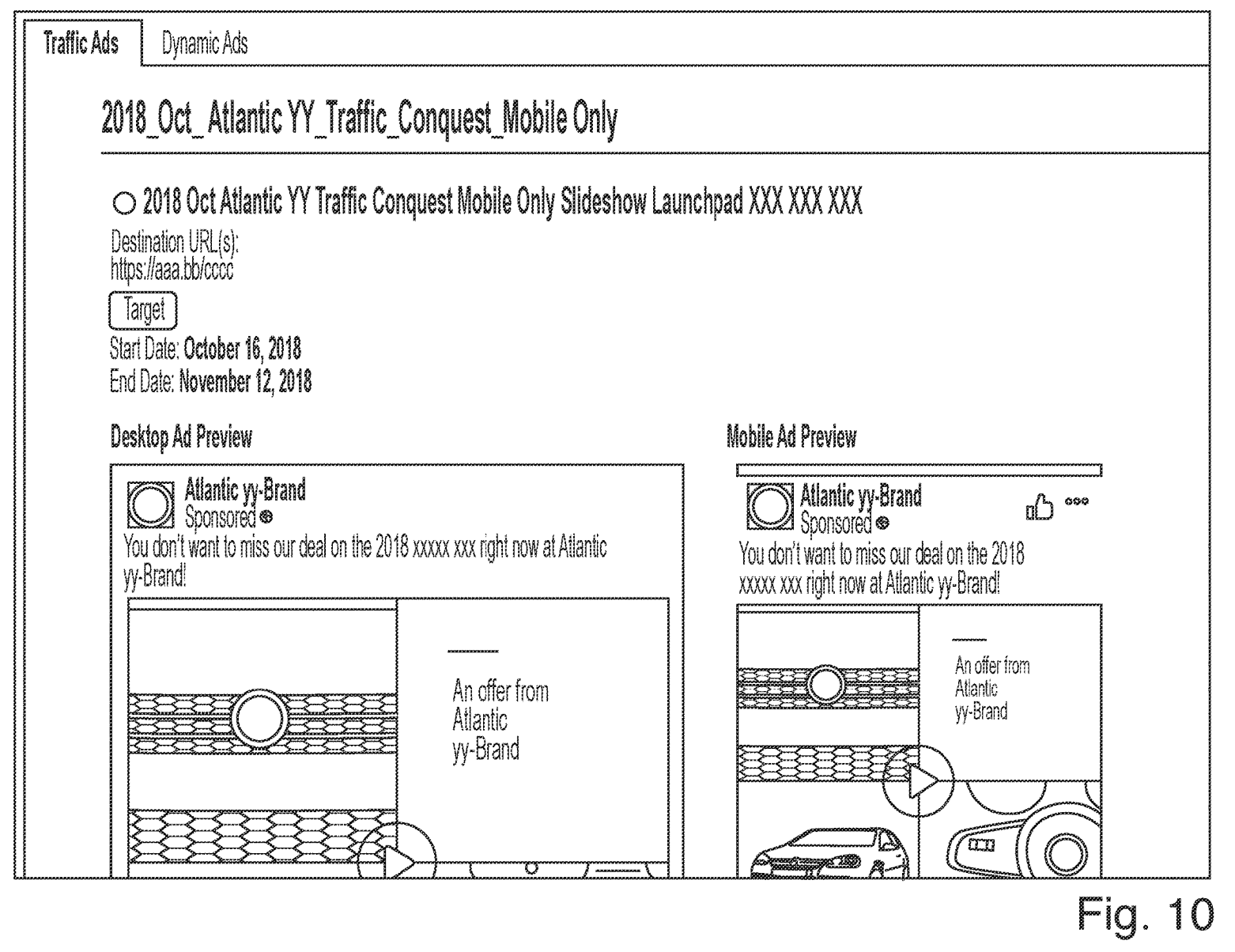
Figure 11:
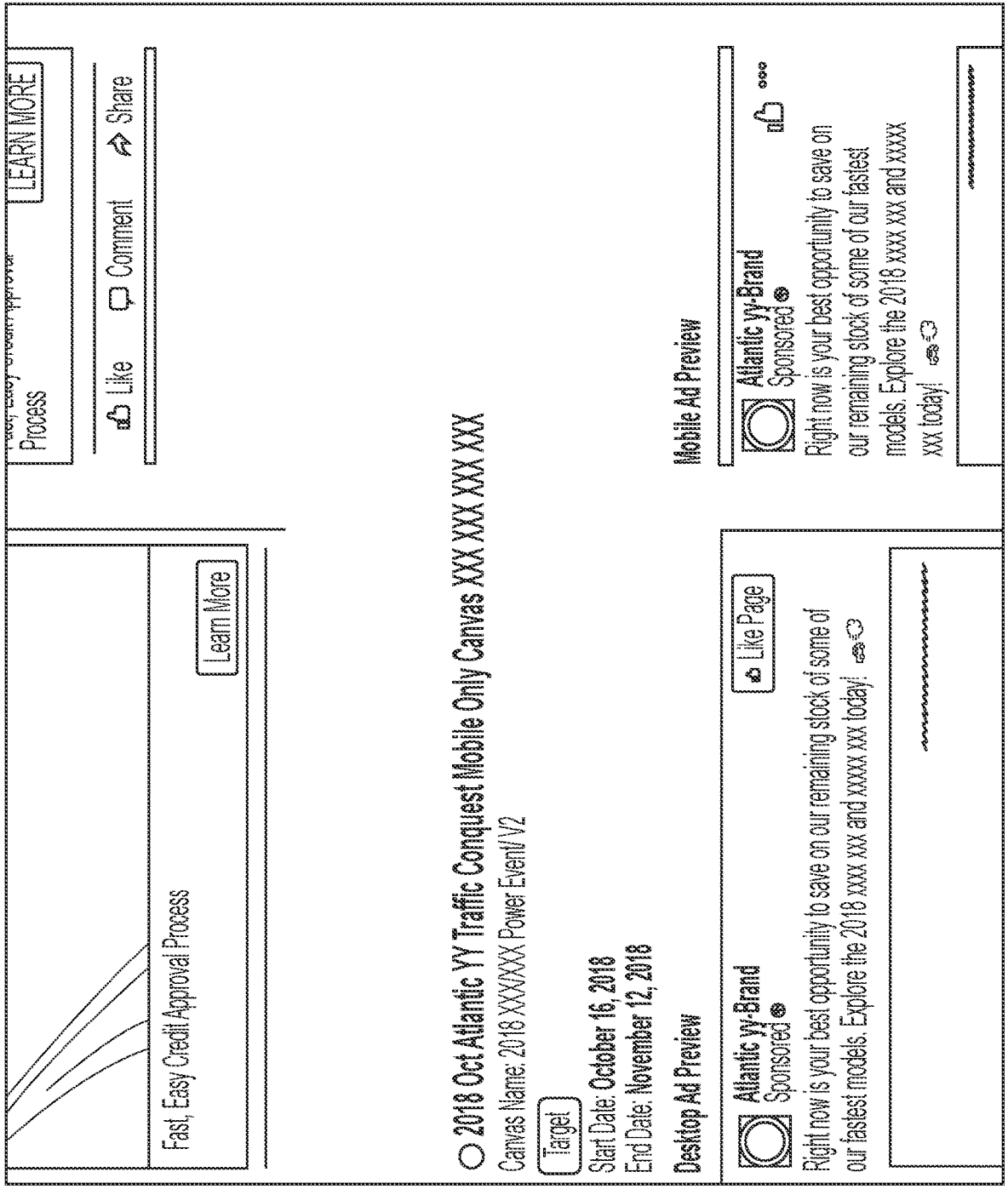
FIG. 11 illustrates another example user interface that shows previews of advertisement in one embodiment.

With the automation tool of the present disclosure, in some aspects, a user can select client advertisement accounts, and time of the advertisement, e.g., campaign year, and campaign month. FIG. 9 illustrates an example user interface that allows the user to select or input information such as client advertisement accounts and time of the advertisement, in one embodiment. The automation tool may then present all the advertisement previews for the selected time (e.g., month) and their associated metadata. FIG. 10 illustrates an example user interface that shows previews of advertisement and associated metadata in one embodiment. This unified view expedites a quality control process and allows users to bulk-review advertisements quickly with minimal page clicks. FIG. 11 illustrates another example user interface that shows previews of advertisement in one embodiment.

Figure 12:
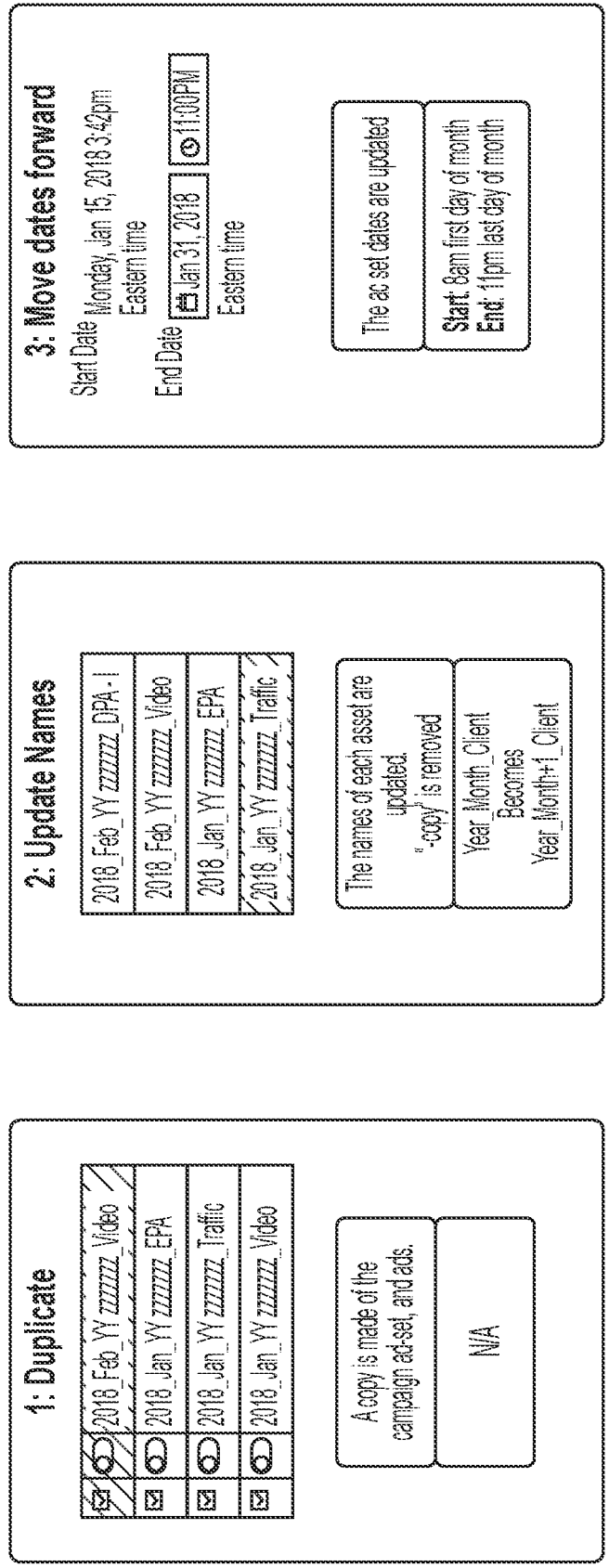
FIG. 12 illustrates example user interfaces in one embodiment, which show progresses of duplicating updating names, moving dates forward, changing link description and changing marketing title.

The automation tool of the present disclosure, in some aspects, may also allow for expediting workflow and quality control improvements. For example, with a single button press, the automation tool may allow users to be able to perform duplication, update names, move dates forward, change link description and change marketing title. FIG. 12 illustrates example user interfaces in one embodiment, which show progresses of duplicating updating names, moving dates forward, changing link description and changing marketing title. A single press on a user interface performs all such functions, for example, within approximately 5 seconds. In some aspects, the preview tool is used after the automation processes are invoked. The following illustrates a use case example. A client has a set of advertisements (or content) that were run in the month of April. Copying, re-naming, and altering these advertisements to prepare them for being run in March ("Flipping Months") may be a tedious, manual process. The automation tool expedites and improves this process, for example, turning a 20 minute process into a single button click. In some aspects, after the automation is complete, the preview tool may be used to visualize all the changes made to the advertisements by the automation program. Human error may be removed, with the operator overseeing the machine, rather than directly making changes to the client advertisements.

A computer readable storage medium storing a program of instructions executable by a machine to perform one or more methods described herein also may be provided. In some aspects, the computer readable storage medium may be non-transitory medium.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for a user interface for creating a preview content page, comprising:
   receiving client identification, time period and campaign information associated with a campaign via a user interface input field;
   invoking an application programming interface to access a third party site's data content associated with the campaign launched during the time period, the third party site being a social network site of a manufacturer;
   receiving from the third party site, the data content associated with the campaign launched during the time period and metadata associated with the data content, the data content comprising a plurality of advertisements promoting a product of the campaign;
   presenting the plurality of advertisements promoting the product of the campaign in the data content on the user interface's display window, the user interface's display window further including a share-link graphical user interface element;
   creating a public web site to hold the data content comprising a plurality of advertisements promoting the product of the campaign; and
   responsive to the share-link graphical user interface element being activated, generating a uniform resource locator (URL) link pointing to the public website holding the plurality of advertisements promoting the product of the campaign and sending the URL link to one or more users for allowing the one or more users to share the link on a public web site page and to preview the plurality of advertisements promoting the product of the campaign via the URL link, the one or more users including one or more manufacturer dealerships, wherein the preview of the plurality of advertisements further including advertisement metadata, wherein the advertisement metadata includes metrics that indicate how an advertisement performed during a time the advertisement was run, spending that indicates how much budget was allocated to, and used by, the advertisement over its active lifecycle, date range that indicates when the advertisement was launched and when it concluded, a web address location where the advertisement leads to when clicked or selected.

2. The method of claim 1, wherein the plurality of advertisements in the data content is shown in a single view on the user interface's display window.

3. The method of claim 1, wherein the third party site includes an automobile manufacturer's social network page.

4. The method of claim 3, wherein the users include multiple different automobile dealerships.

5. A non-transitory computer readable storage medium storing a program of instructions executable by a machine to perform a method of for a user interface for creating a preview content page, comprising:

receiving client identification, time period and campaign information associated with a campaign via a user interface input field;

invoking an application programming interface to access a third party site's data content associated with the campaign launched during the time period, the third party site being a social network site of a manufacturer;

receiving from the third party site, the data content associated with the campaign launched during the time period and metadata associated with the data content, the data content comprising a plurality of advertisements promoting a product of the campaign;

presenting the plurality of advertisements promoting the product of the campaign in the data content on the user interface's display window, the user interface's display window further including a share-link graphical user interface element;

creating a public web site to hold the data content comprising a plurality of advertisements promoting the product of the campaign; and responsive to the share-link graphical user interface element being activated, generating a uniform resource locator (URL) link pointing to the public website holding the plurality of advertisements promoting the product of the campaign and sending the URL link to one or more users for allowing the one or more users to share the link on a public web site page and to preview the plurality of advertisements promoting the product of the campaign via the URL link, the one or more users including one or more manufacturer dealerships, wherein the preview of the plurality of advertisements further including advertisement metadata, wherein the advertisement metadata includes metrics that indicate how an advertisement performed during a time the advertisement was run, spending that indicates how much budget was allocated to, and used by, the advertisement over its active lifecycle, date range that indicates when the advertisement was launched and when it concluded, a web address location where the advertisement leads to when clicked or selected.

6. The non-transitory computer readable storage medium of claim 5, wherein the plurality of advertisements in the data content is shown in a single view on the user interface's display window.

7. The non-transitory computer readable storage medium of claim 6, wherein the third party site includes an automobile manufacturer's social network page.

8. The non-transitory computer readable storage medium of claim 7, wherein the users include multiple different automobile dealerships.

9. A user interface system, comprising:

at least one hardware processor coupled with a network interface, the at least one hardware processor configured to at least:

receive client identification, time period and campaign information associated with a campaign via a user interface input field;

invoke an application programming interface to access a third party site's data content associated with the campaign launched during the time period, the third party site being a social network site of a manufacturer;

receive from the third party site, the data content associated with the campaign launched during the time period and metadata associated with the data content, the data content comprising a plurality of advertisements promoting a product of the campaign;

present the plurality of advertisements promoting the product of the campaign in the data content on the user interface's display window, the user interface's display window further including a share-link graphical user interface element;

create a public web site to hold the data content comprising a plurality of advertisements promoting the product of the campaign; and responsive to the share-link graphical user interface element being activated, generate a uniform resource locator (URL) link pointing to the public website holding the plurality of advertisements promoting the product of the campaign and sending the URL link to one or more users for allowing the one or more users to share the link on a public web site page and to preview the plurality of advertisements promoting the product of the campaign via the URL link, the one or more users including one or more manufacturer dealerships, wherein the preview of the plurality of advertisements further including advertisement metadata, wherein the advertisement metadata includes metrics that indicate how an advertisement performed during a time the advertisement was run, spending that indicates how much budget was allocated to, and used by, the advertisement over its active lifecycle, date range that indicates when the advertisement was launched and when it concluded, a web address location where the advertisement leads to when clicked or selected.

10. The user interface system of claim 9, wherein the third party site includes an automobile manufacturer's social network page.

11. The user interface system of claim 9, wherein the users include multiple different automobile dealerships.

12. The user interface system of claim 9, wherein the plurality of advertisements in the data content is shown in a single view on the user interface's display window.

* * * * *